Dec. 19, 1944.  J. DE W. RECTOR  2,365,358
COCONUT MEAT EXTRACTOR
Filed Feb. 10, 1943

INVENTOR.
JACQUELIN DE WITT RECTOR
BY
Oscar A. Mellin
ATTORNEY.

Patented Dec. 19, 1944

2,365,358

UNITED STATES PATENT OFFICE 2,365,358

COCONUT MEAT EXTRACTOR

Jacquelin De Witt Rector, San Leandro, Calif.

Application February 10, 1943, Serial No. 475,400

5 Claims. (Cl. 146—7)

This invention relates to devices for the extraction of the meat from coconuts.

In extracting the white meat from coconuts it is essential that it be free from any particles of the brown skin which envelopes the meat and is disposed between it and the shell. Prior to my present invention the most common method of extracting meat from coconuts was to first steam the coconuts to free the meat thereof from its enveloping brown skin. After this operation the coconut shell was cracked and removed and the brown skin peeled from the meat. This process, of course, involves considerable labor and is consequently comparatively expensive. Also the steaming discolors the white meat which is an undesirable feature.

It is the principal object of my present invention to provide an improved and efficient coconut coring device by means of which substantially all of the white meat may be quickly and inexpensively removed from the raw coconut free from the brown skin, and without discoloration of the white meat.

To accomplish this object I provide a novel cuttter head which includes a plurality of radially disposed cutting edges which are spaced apart circumferentially and which are arranged longitudinally to present a contour somewhat conforming to the curvature of inner contour of a coconut shell. The raw coconut is severed in half by means of sawing or by any other desirable means and the cutter head is projected into a half so that the cutting edges will cut away the white meat thereof as the cutter head revolves. To prevent the cutter from cutting away the brown skin, each cutting edge is provided with a stop or guard which projects radially outwardly therefrom a distance just slightly greater than the thickness of the brown skin. These stops or guards are sufficiently keen to penetrate through the meat as the cutting is accomplished, but insufficiently keen to penetrate into the coconut shell so that at all times the cutting edges are maintained spaced from the coconut shell a distance just slightly greater than the thickness of the skin. Thus, the cutters will not remove any of the skin during the cutting operation.

One form which the invention may assume is exemplified in the following description, and illustrated by way of example in the accompanying drawing.

Figure 1:
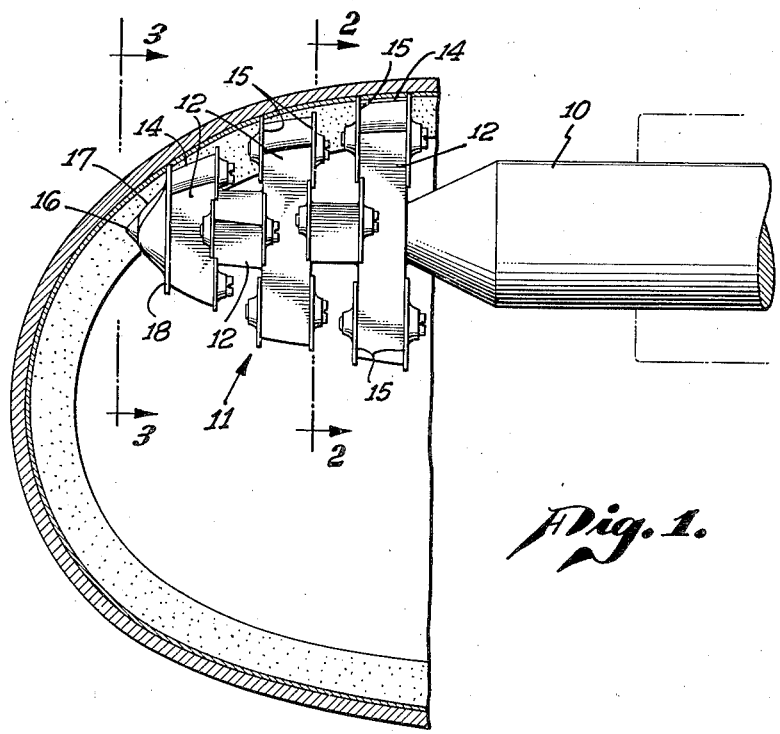
Fig. 1 is a view in side elevation of my improved coconut coring device showing it projected into a coconut half to illustrate the manner in which it operates.
Figures 2, 3:
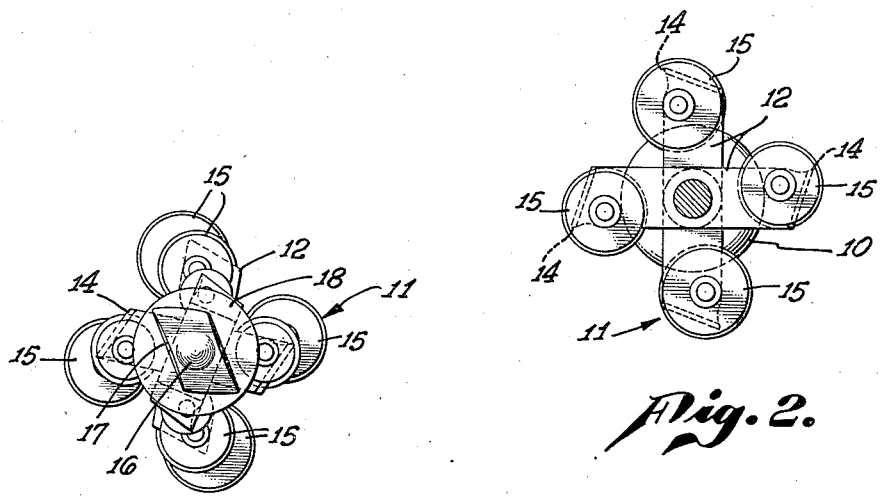
Fig. 2 is a transverse sectional view through the cutter head taken on line 2—2 of Fig. 1.
Fig. 3 is an end view of the cutter head.

Referring more particularly to the accompanying drawing, 10 indicates a mandrel on which is formed a cutter head 11. It is intended that the mandrel be revoluble although immovable longitudinally. This, however, is a matter of choice and it is obvious that the mandrel and cutter head may be operated in various other ways.

The cutter head consists of a plurality of cutter members 12 which extend radially with respect to the axis of the mandrel and cutter head. The outer end of each cutter member 12 is formed with a cutting edge 14 which extends longitudinally with respect to the axis of the head. In the present instance I have shown five sets of these cutters, although it is obvious that a greater or lesser number may be employed.

The sets of cutters are arranged in juxtaposition longitudinally, as illustrated, and their radial dimensions progressively decrease from one end of the cutter head to the other as illustrated so that the outer contour of the cutter head will conform somewhat to the curvature of the inner contour of a coconut shell. The cutting edges 14 of the cutters conform somewhat to this contour as illustrated. The cutting edges of each set of cutters 14 are spaced the same radial dimension from the axis of the mandrel. The cutters of the sets are relatively staggered circumferentially about the mandrel as illustrated.

In order that the cutters may cut away substantially all of the white meat of the coconut without cutting away the brown outer skin of the meat, each cutter edge 14 is provided with a pair of stop or guard disks 15 which are pivoted to the cutter member at the opposite ends of the cutting edge 14 as illustrated. The diameter of these guard disks 15 and their mounting on the cutter 12 is such that their peripheral edges project a slight distance radially outward from the adjacent cutting edge 14, the distance being slightly greater than one thickness of the brown skin of a coconut.

The peripheral edges of the cutter disks 15 are sufficiently keen so that they will penetrate through the white meat as the cutters advance therethrough, but are insufficiently keen to penetrate into the hard shell of the coconut. Thus when the guard disks 15 engage the shell of the coconut the advance of the adjacent cutting edge 14 toward the shell is discontinued at a point short of the brown skin so that it will not remove the same.

At the outer end of the cutter head it is formed with a pilot 16 likewise insufficiently keen to penetrate the shell of the coconut. Adjacent this pilot is a cutting edge 17. Between this cutting edge and the adjacent cutter member 12 is a guard disk 18. The pilot 16 and the guard disk 18 naturally cooperate in preventing the cutting edge 17 from cutting the brown skin of the coconut as will be obvious from the drawing.

In operation of the device the raw coconut is cut in half by means of a band saw or in any other suitable manner. The mandrel 10 and the cutter head 11 are then revolved at comparatively high speed. The operator grasps a half of the coconut with both hands and projects it over the cutter head 11 in an excentric position so that the cutter will penetrate and cut away the meat until its guard disks 15 and 18 engage the shell of the coconut. The coconut is then gyrated about the cutter head until all of the white meat has been cut away therefrom. This requires an extremely short period of time. Inasmuch as the cutter edges 14 can never come sufficiently close to the shell to cut away the skin the latter remains in the shell while substantially all of the white meat is extracted.

From the foregoing it is obvious that I have provided a very simple and inexpensive device by means of which the white meat of a coconut may be removed therefrom without removal of the skin and without discoloration and in a very simple, rapid and inexpensive fashion.

While I have shown the preferred form of my invention, it is to be understood that various changes may be made therein by those skilled in the art without departing from the spirit of the invention as defined in the appended claims.

Having thus described my invention, what I claim and desire to secure by Letters Patent is:

1. In a device of the character described a mandrel, a plurality of sets of radially positioned longitudinal cutting edges fixed thereon, said sets of cutting edges being arranged in juxtaposition longitudinally of the mandrel but relatively staggered circumferentially, the cutting edges of each set being spaced equal distances radially of the mandrel, the radial spacing of the cutting edges of the separate sets progressively decreasing from the first set to the last thereof, and stop members at opposite ends of each cutting edge projecting a slight distance radially outward from said cutting edge.

2. In a device of the character described a cutter head comprising a plurality of longitudinal cutting edges arranged radially about the axis of the cutter head and being arranged in sets arranged in juxtaposition longitudinally of the axis of the cutter head, the cutting edges of each set being spaced apart circumferentially and at equal radial dimensions from the axis of the cutter head, the said radial dimensions of the cutting edges of the sets progressively decreasing from the first to the last set, and stop members at the opposite ends of each cutting edge projecting a slight distance radially outward from said cutting edge.

3. In a device of the character described, a cutter head comprising a plurality of longitudinal cutting edges arranged radially about the axis of the cutter head and being disposed in sets arranged in juxtaposition longitudinally of the axis of the cutter head, the cutting edges of each set being spaced apart circumferentially but spaced at equal radial distances from the axis of the cutter head, the said radial spacing of the cutting edges of the sets progressively decreasing in dimensions from the first to the last set, a disk secured at each end of each cutting edge with their peripheral edges extending a short distance radially outward from said cutting edge.

4. In a device of the character described, a cutter head comprising a plurality of longitudinal cutting edges arranged radially about the axis of the cutter head and being arranged in sets arranged longitudinally of the axis of the cutter head, the cutting edges of each set being spaced apart circumferentially and at equal radial dimensions from the axis of the cutter head, the said radial dimensions of the sets progressively decreasing from the first to the last set, a disk secured at each end of each cutting edge with their peripheral edges extending a short distance radially outward from said cutting edge, said disks being revoluble and of sufficient keenness to penetrate the white meat of a coconut, but insufficient in keenness to penetrate the shell of a coconut.

5. In a device of the character described, a cutter head comprising a plurality of radially disposed cutter members, each having a cutting edge at its outer extremity extending longitudinally with respect to the axis of the cutter head, said cutter members being spaced apart circumferentially and decreasing in radial dimension progressively from one end of the cutter head to the other, each cutter member having disks at opposite sides of each cutting edge and lying in a plane parallel to the transverse axis of the cutter head and being rotatably secured to the cutter member at a point thereon whereby the peripheral edges of the disks will project radially outward a short distance from the cutting edge.

JACQUELIN DE WITT RECTOR.